(12) United States Patent
Chen et al.

(10) Patent No.: US 8,494,797 B2
(45) Date of Patent: Jul. 23, 2013

(54) ENERGY DETECTION METHOD AND AN ENERGY DETECTION CIRCUIT USING THE SAME

(75) Inventors: Jian-Yu Chen, Puli Township, Nantou County (TW); Shun-Chang Lo, Hsinchu (TW); Gene C. H. Chuang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 266 days.

(21) Appl. No.: 12/981,180

(22) Filed: Dec. 29, 2010

(65) Prior Publication Data

US 2012/0072151 A1   Mar. 22, 2012

(30) Foreign Application Priority Data

Sep. 16, 2010 (TW) ............................ 99131515 A (51) Int. Cl.
*G01R 13/00* (2006.01)
(52) U.S. Cl.
USPC ........................................... 702/69; 702/189
(58) Field of Classification Search
USPC ................................................... 702/69, 189
See application file for complete search history.

(56) References Cited

U.S. PATENT DOCUMENTS

| | | | |
|---|---|---|---|
| 4,539,526 A | 9/1985 | Davis | |
| 5,642,377 A | 6/1997 | Chung et al. | |
| 5,832,035 A * | 11/1998 | Fullerton | 375/149 |
| 6,229,842 B1 | 5/2001 | Schulist et al. | |
| 6,230,122 B1 * | 5/2001 | Wu et al. | 704/226 |
| 6,359,508 B1 * | 3/2002 | Mucenieks | 330/149 |
| 6,819,760 B1 | 11/2004 | Nayler | |
| 7,472,025 B2 | 12/2008 | Lin | |
| 2002/0008579 A1 * | 1/2002 | Mucenieks et al. | 330/149 |
| 2004/0161064 A1 * | 8/2004 | Brethour et al. | 375/347 |
| 2005/0266803 A1 | 12/2005 | Dinur et al. | |
| 2005/0271133 A1 | 12/2005 | Waxman | |

FOREIGN PATENT DOCUMENTS

KR    2010071393 A  *  6/2010

OTHER PUBLICATIONS

Machine translation for KR 2010071393 A.*
Digham et al, "On The Energy Detection of Unknown Signals Over Fading Channels", IEEE Transactions on Communications, Jan. 2007, pp. 21-24, vol. 55.
Kim et al, "Energy Detector Using a Hybrid Threshold in Cognitive Radio Systems", IEICE Trans. Commun., Oct. 2009, pp. 3079-3083, vol. E92-B, No. 10.

(Continued)

*Primary Examiner* — Jonathan C Teixeira Moffat
*Assistant Examiner* — Eman Alkafawi
(74) *Attorney, Agent, or Firm* — Muncy, Geissler, Olds & Lowe, PLLC (57) ABSTRACT

An energy detection method is provided. The method obtains an initial time point of an input signal with reference to a digital signal corresponding to the input signal. An $i^{th}$ sample value is obtained by sampling the digital signal. The $(i-M-N+1)^{th}$ to the $(i-N)^{th}$ sample values and the $(i-N+1)^{th}$ to the $i^{th}$ sample value are buffered. The weighting coefficient is set to with initial value. A first parameter is obtained according to the weighting coefficient and the $(i-M-N+1)^{th}$ to the $(i-N)^{th}$ sample values, and a second parameter is obtained according to the $(i-N+1)^{th}$ to the $i^{th}$ sample values. A comparison between the first parameter and the second parameter is made, and the sampling time point of the $(i-N+1)^{th}$ sample value is determined as the signal initial time point when the second parameter is greater than the first parameter.

16 Claims, 6 Drawing Sheets

OTHER PUBLICATIONS

Nuttall, Albert H., IEEE Transactions on Information Theory, Jan. 1975, pp. 95-96.

Lei et al., "Sensing OFDM Systems Under Frequently Selective Fading Channels", 2009, pp. 1-10.

Lee, et al., "Energy Detector Using Adaptive-Fixed Thresholds in Cognitive Radio Systems", Proceedings of APCC, 2008, four pages.

Ruttik et al., "Detection of Unknown Signals in a Fading Environment", IEEE Communications Letters, Jul. 2009, pp. 498-500, vol. 13, No. 7.

Urkowitz, Harry, "Energy Detection of Unknown Deterministic Signals", Proceedings of the IEEE, Apr. 1967, pp. 523-531, vol. No. 4.

* cited by examiner

| SNR (dB) | K |
|---|---|
| -4~-2.2 | 1.625 |
| -2.2~2.2 | 1.75 |
| 2.2~4 | 1.875 |
| 4~8 | 2 |

FIG. 4

ENERGY DETECTION METHOD AND AN ENERGY DETECTION CIRCUIT USING THE SAME

This application claims the benefit of Taiwan application Serial No. 099131515, filed Sep. 16, 2010, the subject matter of which is incorporated herein by reference.

BACKGROUND

1. Technical Field

The disclosure relates in general to an energy detection method and the energy detection circuit.

2. Description of the Related Art

Along with the wide popularity and rapid development of wireless communication, time division multiplex system has been widely used in communication system such as the Time Division Duplex Long Term Evolution (TD-LTE) protocol, the Worldwide Interoperability for Microwave Access (WiMAX) protocol and the Institute of Electrical and Electronics Engineers (IEEE) 802.16m protocol.

In the communication system based on frame structure, when the receiver starts to receive a signal, the strength and properties of the signal are unknown. Thus, in the current communication system, the distortion of signal amplitude tends to occur to the receiver, and error and shift may occur to the mechanism which uses the properties of the signal for synchronization. Conventionally, the initial position of the signal (that is, the initial time point of the frame structure) is obtained by the energy detection method, so that the receiver can activate its automatic gain control (AGC) mechanism to adjust the strength of the signal, so that the properties of the signal will not be jeopardized and synchronization can be achieved with higher accuracy.

In the current technologies, the energy detection method has a fixed energy threshold, and the initial position of the signal is determined when the energy of the input signal is greater than the threshold.

SUMMARY

The disclosure is directed to an energy detection method and an energy detection circuit using the same. The energy detection method and the energy detection circuit using the same of the present embodiment of the present disclosure have an energy detection threshold that can be dynamically adjusted, produce superior noise immunity and result in higher accuracy in energy detection.

According to an embodiment of the present disclosure, an energy detection circuit is provided. The energy detection circuit is used in a receiver for obtaining an initial time point of an input signal with reference to a digital signal corresponding to the input signal. The energy detection circuit includes a value obtaining switch, a shift register, a first arithmetic unit, a second arithmetic unit, a comparator and a processor. The value obtaining switch is turned on in response to a control signal for providing an $i^{th}$ sample value of a digital signal at a first sampling time point, wherein i is a natural number greater than 1. The $(i-M-N+1)^{th}$ to the $i^{th}$ sample values are buffered in the shift register, wherein M and N both are a natural number greater than 1. In an example, M and N are numbers capable of expressed as: $2^x$, wherein x is a natural number. The shift register includes a first and a second sliding window value obtainer, which respectively buffer the $(i-M-N+1)^{th}$ to the $(i-N)^{th}$ sample values and the $(i-N+1)^{th}$ to the $i^{th}$ sample values. The first arithmetic unit obtains a first parameter according to the weighting coefficient and the $(i-M-N+1)^{th}$ to the $(i-N)^{th}$ sample values, and the second arithmetic unit obtains a second parameter according to the $(i-N+1)^{th}$ to the $i^{th}$ sample value. The comparator compares the first parameter to the second parameter, and provides an energy detection signal when the second parameter is greater than the first parameter. The processor sets the weighting coefficient with an initial value, and further determines whether the energy detection signal is received. When receiving the energy detection signal, the processor further determines the sampling time point of the $(i-N+1)^{th}$ sample value as the signal initial time point. The processor further determines whether the synchronization of the digital signal is successful. If so, then the signal to noise ratio (SNR) of the input signal is calculated, and the weighting coefficient is set accordingly. The processor further provides the control signal to drive the value obtaining switch to provide the $(i+1)^{th}$ sample value when the second parameter is not greater than the first parameter.

According to another embodiment of the present disclosure, an energy detection method is provided. The energy detection method is used in a receiver for obtaining an initial time point of an input signal with reference to a digital signal corresponding to the input signal. An $i^{th}$ sample value is obtained by sampling the digital signal at a sampling time point, wherein i is a natural number greater than 1. The $(i-M-N+1)^{th}$ to the $(i-N)^{th}$ sample values are buffered, and the $(i-N+1)^{th}$ to the $i^{th}$ sample values are also buffered, wherein M and N both are a natural number greater than 1. The weighting coefficient is set with an initial value. A first parameter is obtained according to the weighting coefficient and the $(i-M-N+1)^{th}$ to the $(i-N)^{th}$ sample values, and a second parameter is obtained according to the $(i-N+1)^{th}$ to the $i^{th}$ sample values. A comparison between the first parameter and the second parameter is made, and when the second parameter is greater than the first parameter, an energy detection signal is provided, and the sampling time point of the $(i-N+1)^{th}$ sample values is determined as the signal initial time point. Whether the energy detection signal is received is determined. If so, whether the synchronization of the digital signal is successful is determined. If the synchronization of the digital signal is successful, then the SNR of the input signal can be calculated, and the weighting coefficient is set accordingly.

The above and other aspects of the disclosure will become better understood with regard to the following detailed description of the non-limiting embodiment(s). The following description is made with reference to the accompanying drawings.

DETAILED DESCRIPTION

Figure 1:
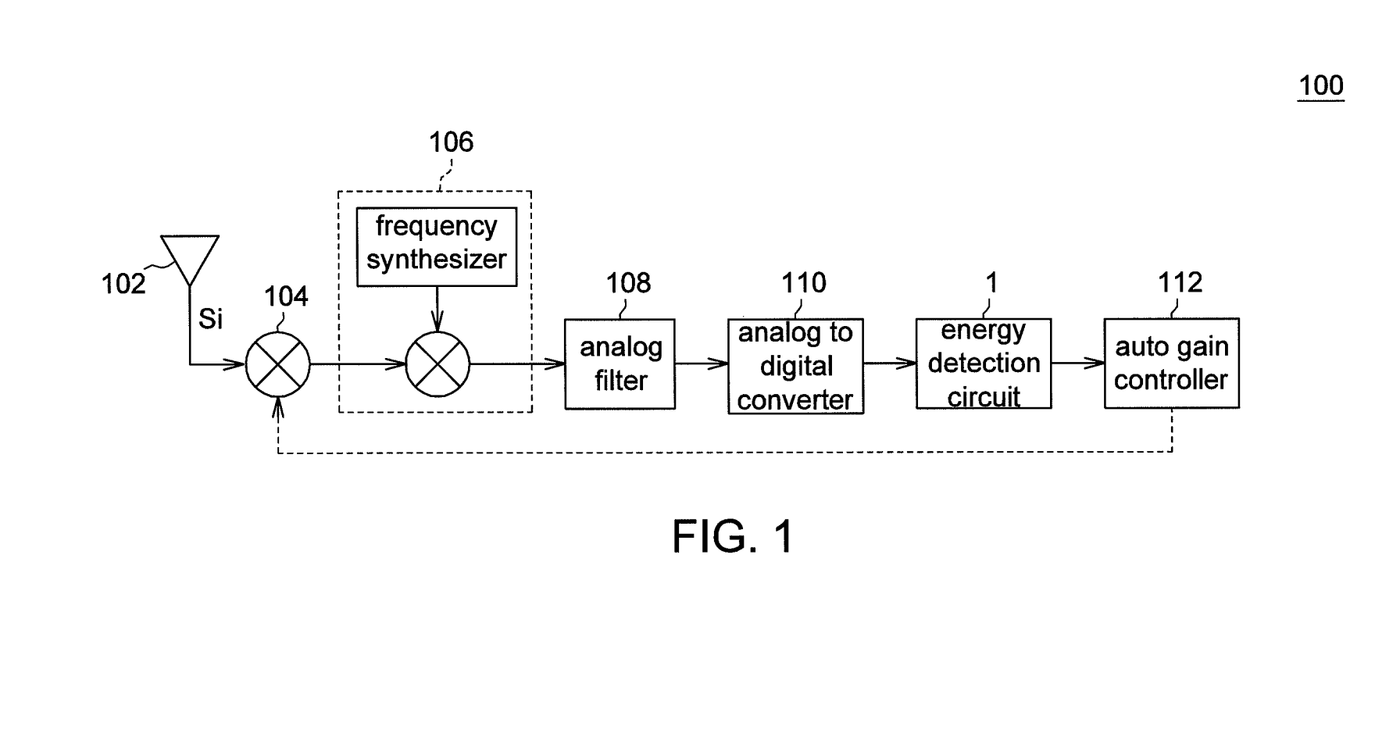
FIG. 1 shows a block diagram of a receiver using an embodiment of the disclosure.

Referring to FIG. 1, a block diagram of a receiver using an embodiment of the disclosure is shown. The energy detection circuit 1 of the present embodiment of the disclosure is used in a signal receiver 100 for performing energy detection with respect to a received input signal Si. The receiver 100 includes an antenna 102, a gain amplifier 104, a frequency synthesizer 106, an analog filter 108 and an analog to digital converter 110. The previously cited circuits receive an input signal Si and perform related processing to the received input signal Si to correspondingly generate a digital signal R to which energy detection to performed.

The energy detection circuit of the present embodiment of the disclosure detects the initial position of the input signal Si (that is, the initial time point of the frame structure of the input signal) according to a digital signal R. The signal receiver 100 using the energy detection circuit of the present embodiment of the disclosure includes an auto gain controller (AGC) 112, which performs gain control with respect to the gain amplifier 104 according to the initial position of the input signal Si. The signal receiver 100 further includes other signal processing circuits (such as interpolator, square root raised cosine (SRRC) filter and fast Fourier transform (FFT)) for performing other processing to the input signal Si. The energy detection circuit of the present embodiment of the disclosure is elaborated below.

Figure 2:
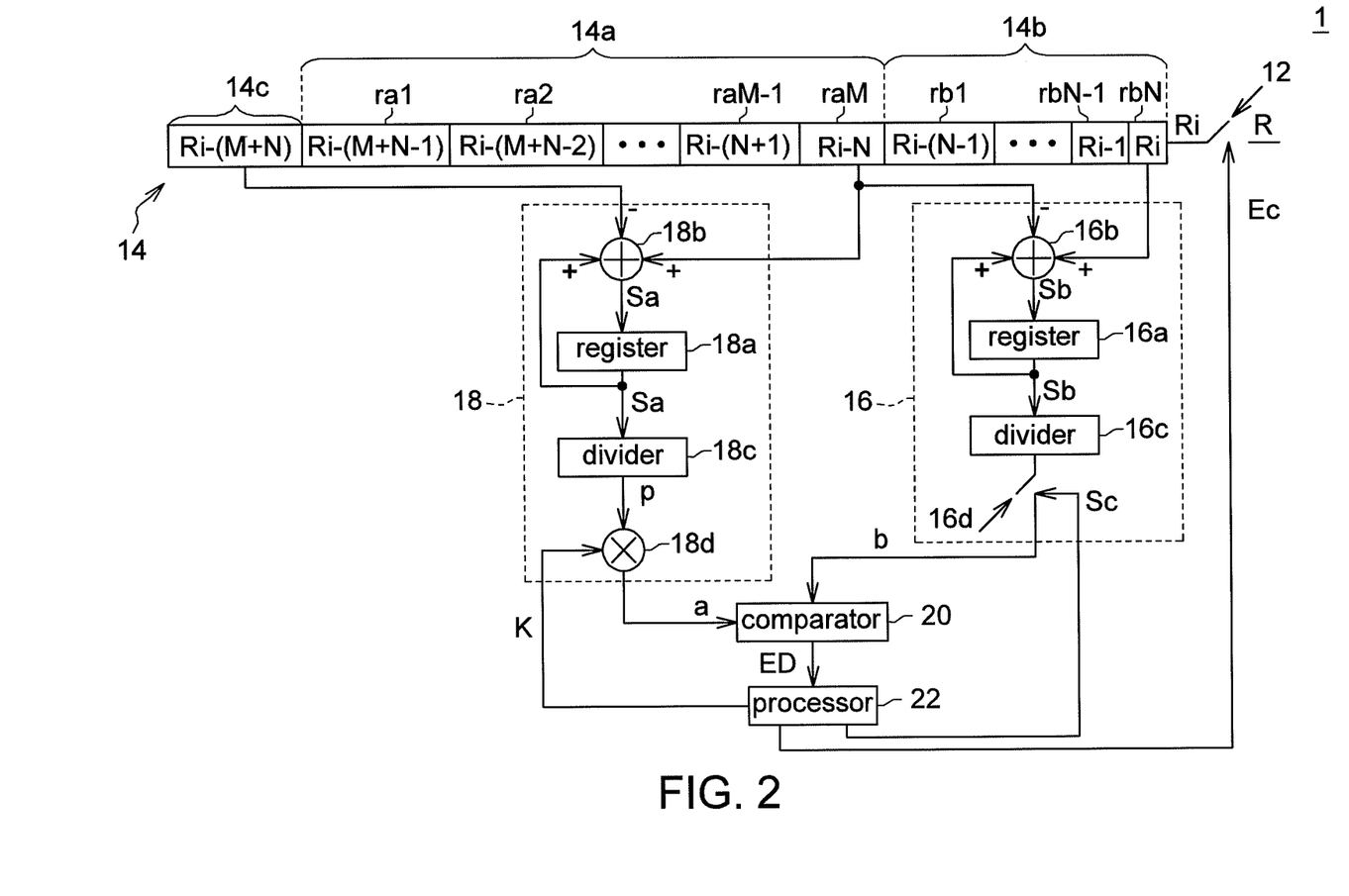
FIG. 2 shows a block diagram of an energy detection circuit according to an embodiment of the disclosure.

Referring to FIG. 2, a block diagram of an energy detection circuit according to an embodiment of the disclosure is shown. The energy detection circuit 1 includes a value obtaining switch 12, a shift register 14, arithmetic units 16 and 18, a comparator 20 and a processor 22. The value obtaining switch 12 is turned on in response to the control signal Ec to provide a digital signal R to the shift register 14 and to input the $i^{th}$ sample value Ri of the digital signal R to the shift register 14 at the first sampling time point, wherein i is a natural number greater than 1.

The shift register 14 has (M+N) buffers for buffering the sample values, such as (M+N) sample values, provided by the value obtaining switch 12, wherein M and N both are an integer greater than 1. The shift register 14, for example, includes sliding window value obtainers 14a and 14b, wherein the sliding window value obtainer 14a includes M buffers ra1, ra2, . . . , raM and the sliding window value obtainer 14b includes N buffers rb1, rb2, . . . , rbN. The registers ra1 to raM of the sliding window value obtainer 14a respectively buffer the $(i-M-N+1)^{th}$ to the $(i-N)^{th}$ sample values $R_{i-(M+N-1)}$ to $R_{i-N}$. The register rb1 to rbN of the sliding window value obtainer 14b respectively buffer the $(i-N+1)^{th}$ to the $i^{th}$ sample value $R_{i-(M+N-1)}$ to $R_{i-N}$. For example, i equal to the value (M+N), the buffers ra1 to raM respectively store the sample values $R_1$ to $R_M$, and the buffers rb1 to rbN respectively store the sample values $R_{M+1}$ to $R_{M+N}$.

When receiving the sample value most recently provided by the value obtaining switch 12, each register of the shift register 14 shifts the sample values originally stored therein to the left, so that the rightmost register (that is, the register rbN) is vacated for buffering the most recently inputted sample value. The shift register 14 further includes an overflowing register 14c for buffering the $(i-M-N)^{th}$ sample value (that is, the overflowing sample value) when the $i^{th}$ sample value Ri is received by the shift register 14.

In the present paragraphs, an operation example, in which the most recently inputted sample value is the $(M+N+1)^{th}$ sample value $R_{M+N+1}$, is discussed for more detailed illustration. Before the shift register 14 receives the sample value $R_{M+N+1}$, the registers ra1 to raM respectively buffer M sample values $R_1$ to $R_M$, and the registers rb1 to rbN respectively buffer N sample values $R_{M+1}$ to $R_{M+N}$. After the shift register 14 receives the sample value $R_{M+N+1}$ and performs the shift operation, the rightmost register rbN is vacated for buffering the $(M+N+1)^{th}$ digit value $R_{M+N+1}$, and the $(M+N)^{th}$ digit value $R_{M+N}$ originally buffered in the register rbN is shifted to the left and stored in the register rbN−1. Like the foregoing left-shifting operation, the registers ra1 to raM respectively buffer the sample values $R_2$ to $R_{M+1}$ which are originally stored in the register ra2 to rb1, the registers rb1 to rbN−2 respectively buffer the sample values $R_{M+2}$ to $R_{M+N-1}$ which are originally stored in the registers rb2 to rbN−1, and the sample value $R_1$ originally stored in the register ra1 is vacated from the register ra1 and becomes an overflowing sample value. The overflowing register 14c is used for buffering the sample value $R_1$ (that is, the overflowing sample value) when the shift register 14 receives the $(M+N+1)^{th}$ sample value $R_{M+N+1}$.

The arithmetic unit 16 obtains a parameter b according to the sample values buffered in the sliding window value obtainer 14b, wherein the parameter b is used for indicating the average energy magnitude of the $(i-N+1)^{th}$ to the $i^{th}$ sample values. The arithmetic unit 16, for example, includes a register 16a, an adder 16b, a divider 16c and a counting switch 16d. The register 16a is used for storing the sum Sb of all the sample values $R_{i-(N-1)}$ to $R_i$ buffered in the registers rb1 to rbN. The adder 16b deducts the sum Sb stored in the register 16a by the $(i-N)^{th}$ sample value and adds the $(i+1)^{th}$ sample value to the difference, so as to update the value of the sum Sb when the next sample value $R_{i+1}$ inputs to the shift register 14. The divider 16c divides the sum Sb by the value N to obtain a parameter b which indicates the average energy magnitude of the $(i-N+1)^{th}$ to the $i^{th}$ sample values. The counting switch 16d is coupled between the divider 16c and the comparator 20, and the counting switch 16d is turned on in response to the control signal Sc to provide the parameter b to the comparator 20 when i is greater than or equal to M+N.

In the present paragraph, an operation example, in which i equal to M+N+1 and the next sample value is the $(M+N+1)^{th}$ sample value $R_{M+N+1}$, is discussed for more detailed illustration. After the sample value $R_{M+N+1}$ inputs to the shift register 14, the registers rb1 to rbN perform the left-shifting operation, so that the registers rb1 to rbN respectively buffer the sample values $R_{M+2}$ to $R_{M+N+1}$. However, the sum Sb stored in the register 16a is still the sum Sb of the sample values $R_{M+1}$ to $R_{m+N}$. Thus, the adder 16b deducts the sum Sb stored in the register 16a by the sample value $R_{M+1}$, and adds the sample value $R_{M+N+1}$ to the difference, so as to update the sum Sb as the sum of the sample values $R_{M+2}$ to $R_{M+N+1}$ when the next sample values $R_{M+N+1}$ inputs to the shift register 14.

The arithmetic unit 18 obtains a parameter a according to the sample values buffered the sliding window value obtainer 14a, wherein the parameter a is used for indicating the average energy magnitude of the sample values $R_{i-(M+N-1)}$ to $R_{i-N}$ and is used as a threshold of the parameter b. The arithmetic unit 18, for example, includes a register 18a, an adder 18b, a divider 18c and a multiplier 18d. Like the arithmetic unit 16, the register 18a of the arithmetic unit 18 is used for storing the sum Sa of all sample values stored in the register ra1 to raM. The adder 18b deducts the sum Sa stored in the register 18a by the $(i-M-N)^{th}$ sample values, and adds the $(i-N)^{th}$ sample value to the difference, so as to update the value of the sum Sa when the next sample values inputs to the shift register 14. The divider 18c divides the sum Sa by the value M to obtain a computation parameter P. The multiplier 18d multiplies the computation parameter P by the weighting coefficient K to obtain the parameter a. For example, the weighting coefficient K is a real number greater than 1.

In the present paragraph, an operation example, in which i equal to (M+N+1) and the next sample value is the $(M+N+1)^{th}$ sample value $R_{M+N+1}$, is discussed for more detailed illustration. After the sample value $R_{M+N+1}$ input to the shift register 14, the registers ra1 to raM perform the left-shifting operation, so that the registers ra1 to raM respectively buffer the sample values $R_2$ to $R_{M+1}$. However, the sum Sa stored in the register 18*a* is still the sum Sa of the sample values $R_1$ to $R_M$. Thus, the adder 18*b* deducts the sum Sa stored in the register 18*a* by the sample value $R_1$, and adds the sample value $R_{M+1}$ to the difference, so as to update the sum Sa as the sum of the sample values $R_2$ to $R_{M+1}$ when the next sample values $R_{M+N+1}$ inputs to the shift register 14.

The comparator 20 determines whether the parameter b is substantially greater than the parameter a to determine whether the average of the N most recently sampled sample values $R_{i-(N-1)}$ to $R_i$ of the digital signal R is significantly greater than the average of the previous M sample values Ri−(M+N−1) to Ri−N of the digital signal R multiplied by the weighting coefficient, so as to determine whether the (i−N+1)$^{th}$ sampling time point is the signal initial time point of the digital signal R. If the parameter b is substantially greater than the parameter a, the comparator 20 determines the (i−N+1)$^{th}$ sampling time point as the signal initial time point of the digital signal R, and correspondingly provides an energy detection signal ED which indicates that the (i−N+1)$^{th}$ sampling time point is the signal initial time point of the digital signal R. If the parameter b is smaller than or equal to the parameter a, the comparator 20 determines that the signal initial time point of the digital signal R is not yet detected up to the (i−N+1)$^{th}$ sampling time point, and correspondingly provides an energy detection signal ED indicating the said information.

Figure 3A:
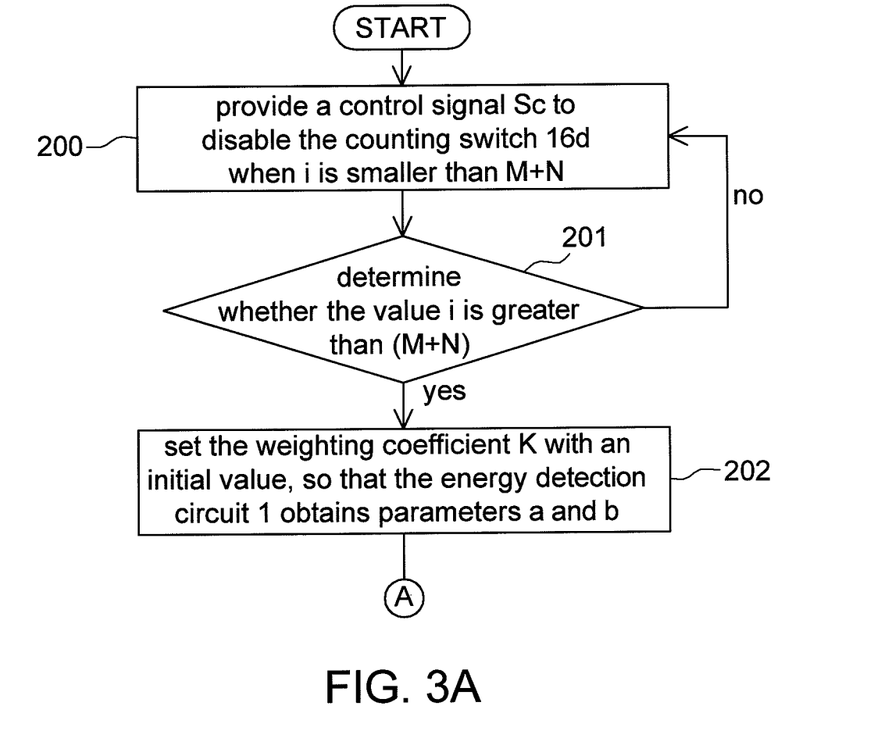
FIGS. 3A-3C show a flowchart of an energy detection method according to an embodiment of the disclosure.
Figure 3B:
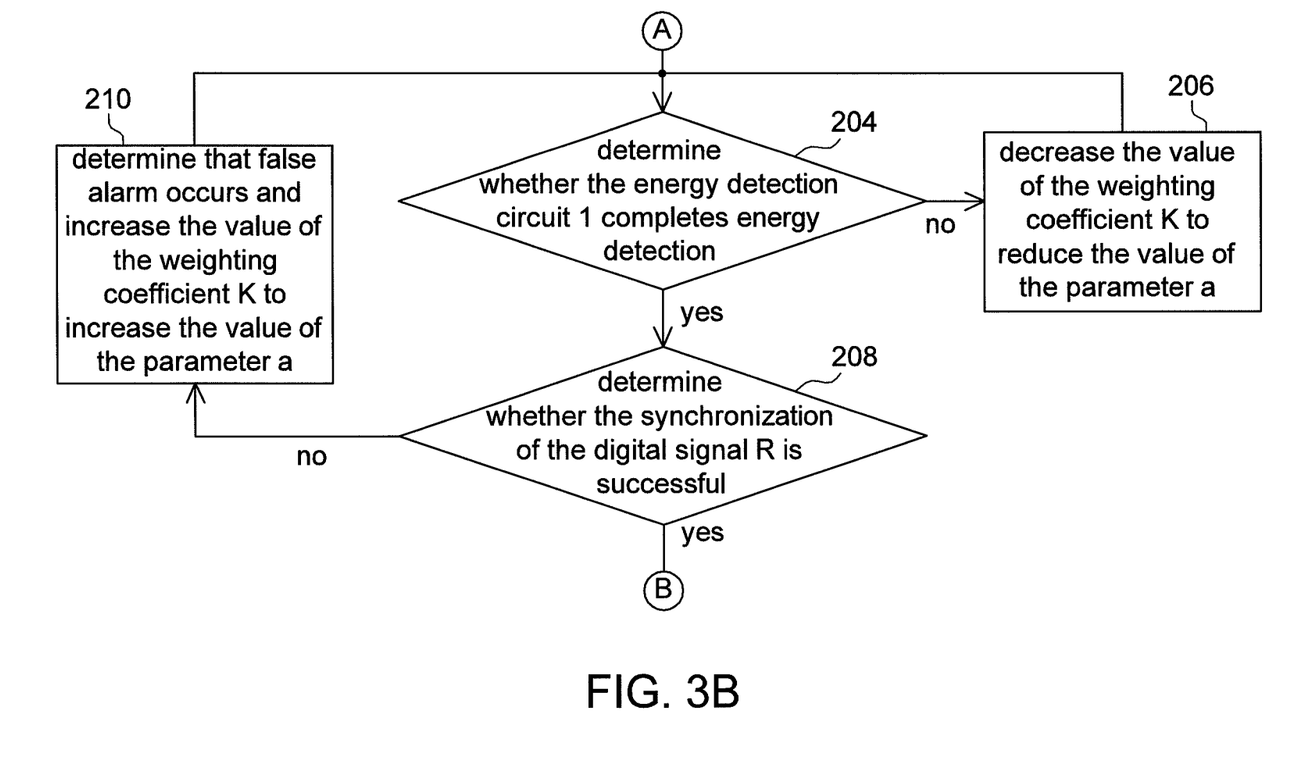
Figure 3C:
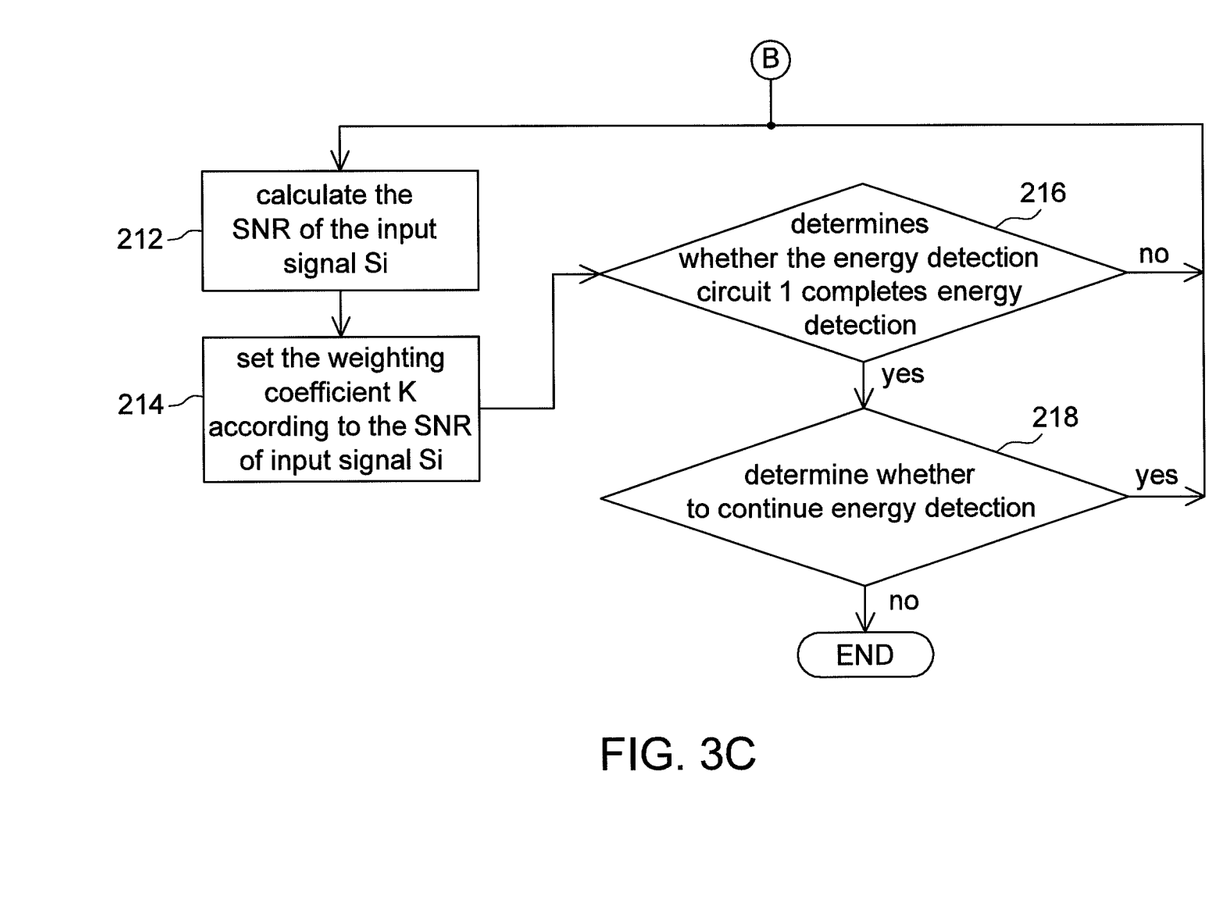

The processor 22 performs the energy detection method to control the operation of the energy detection circuit 1. The flowchart of the energy detection method performed by the processor 22 is illustrated in FIGS. 3A-3C. The control method includes the following steps. At step 200, when i is smaller than M+N (that is, the number of the sample values inputted to the shift register 14 is smaller than the value (M+N)), a control signal Sc is provided by the processor 22 to disable the counting switch 16*d*. Thus, the parameter b provided by the arithmetic unit 16 cannot be provided to the comparator 20, and the comparator 20 correspondingly determines the parameter b as being smaller than the parameter a, and provides an energy detection signal ED which indicates that the signal initial time point of the digital signal R has not yet been received. In response to the said energy detection signal ED which indicates that the signal initial time point has not yet been received, the processor 22 further generates a control signal Ec to turn on the value obtaining switch 12 to provide the next sample value to the shift register 14, wherein the digital signal R of the next sample value corresponds to the next sampling time point. In other words, the value i is progressively increased by 1, so that the shift register 14 correspondingly buffers the (i−M−N+1)$^{th}$ to the i$^{th}$ sample values $R_{(i-(M+N-1)}$ to $R_i$.

At step 201, whether the value i is greater than (M+N) is determined. If no, the energy detection method repeats step 200, the value i is continuously increased. When the value i is greater than or equal to (M+N), a control signal Sc is provided by the processor 22 to enable the counting switch 16*d*. Thus, the energy detection method exits the loop of repeating step 200, and the parameter b generated by the arithmetic unit 16 can be provided to the comparator 20, which correspondingly determines whether the parameter b is smaller than the parameter a.

For example, after exiting step 200, the energy detection method proceeds to step 202, the weighting coefficient K is set with an initial value by the processor 22, so that each circuit of the energy detection circuit 1 can perform the said operation to obtain parameters a and b according to the weighting coefficient K with an initial value. For example, the initial value is the maximum value of the weighting coefficient K. Since the weighting coefficient K is positively correlated to the value of the parameter a (that is, a threshold of the parameter b), to set the weighting coefficient K to its maximum value implies that the threshold of the parameter b is set as a larger value. In other words, the energy detection circuit 1 detects the signal initial time point of the digital signal R according to the strictest determination criterion, and only when the energy value of the i$^{th}$ sample value is far greater than the energy value of the (i−M−N+1)$^{th}$ to the (i−1)$^{th}$ sample values so that the parameter b is greater than the parameter a weighted with the maximum weighting coefficient K will the energy detection circuit 1 determine that the (i−N+1)$^{th}$ sampling time point of the (i−N+1)$^{th}$ sample value as the signal initial time point of the digital signal R.

At step 204, by determining whether the parameter b is greater than the parameter a through the comparator 20 and providing an energy detection signal ED, the processor 22 correspondingly determines whether the (i−N+1)$^{th}$ sampling time point is the signal initial time point of the digital signal R and whether the energy detection circuit 1 completes energy detection. When the processor 22 receives the energy detection signal ED which indicates that the signal initial time point of the digital signal R is not yet detected, it is indicated that the determination criterion of the energy detection circuit 1 is too strict. At step 206, the value of the weighting coefficient K is decreased by the processor 22 to reduce the value of the parameter a (that is, the threshold of the parameter b). Thus, the processor 22 correspondingly reduces the threshold conditions. In step 206, the processor 22 further generates a control signal Ec to drive the value obtaining switch 12 to provide a next sample value (such as the (1+1)$^{th}$ sample values $R_{i+1}$) at the next sampling time point (such as the (i+1)$^{th}$ sampling time point). Thus, the energy detection circuit 1 can repeat the said operation according to the decreased weighting coefficient K to correspondingly determine whether the next sampling time point is the signal initial time point of the digital signal R and whether the energy detection circuit 1 correspondingly completes energy detection.

When the processor 22 receives the energy detection signal ED which indicates that the sampling time point is the signal initial time point of the digital signal R, this implies that the energy detection circuit 1 completes the said energy detection, and the processor 22 correspondingly proceeds to step 208 to determine whether the synchronization of the digital signal R is successful. When the synchronization of the digital signal R is failed, this implies that in step 204, the processor 22 determines that the sampling time point as the signal initial time point of the digital signal R is a false alarm, and the detection method proceeds to step 210, the value of the weighting coefficient K is increased by the processor 22 to increase the value of the parameter a (that is, the threshold of the parameter b). Thus, the processor 22 correspondingly increases the threshold conditions by which the energy detection circuit 1 detects the signal initial time point of the digital signal R to reduce the likelihood of the said false alarm. In step 210, the processor 22 further generates a control signal Ec to drive the value obtaining switch 12 to provide a next sample values (such as the (i+1)$^{th}$ sample values $R_{i+1}$) at a next sampling time point (such as the (i+1)$^{th}$ sampling time point). Thus, the energy detection circuit 1 can repeat the said operation according to the increased weighting coefficient K to correspondingly determine whether the next sampling time point is the signal initial time point of the digital signal R and whether the energy detection circuit 1 correspondingly completes energy detection.

After step 208, when the synchronization of the digital signal R is successful, this implies that the $(i-N+1)^{th}$ sampling time point is the signal initial time point of the digital signal R, and the detection method proceeds to step 212, a signal to noise ratio (SNR) of the input signal Si is calculated by the processor 22. Then, the method proceeds to step 214, the weighting coefficient K is set by the processor 22 according to the SNR of input signal Si with reference to a lookup table as illustrated in FIG. 4.

Figure 4:
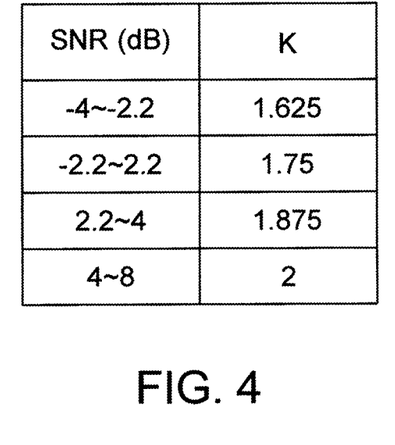
FIG. 4 shows an SNR look-up table of weighting coefficient K and input signal Si.

Let FIG. 4 be taken for example. When the SNR of the input signal Si is higher, this implies that the signal quality of the input signal Si is better, and in step 212, the processor 22 correspondingly selects the weighting coefficient K with larger value so as to correspondingly detect the signal initial time point of the digital signal R according to stricter determination criterion. When the SNR of the input signal Si is lower, this implies that the signal quality of the input signal Si is poorer, and in step 212, the processor 22 correspondingly selects the weighting coefficient K with lower value so as to correspondingly detect the signal initial time point of the digital signal R according to looser determination criterion. In step 212, the processor 22 further generates a control signal Ec to drive the value obtaining switch 12 to increase a next sample value (such as the $(i+1)^{th}$ sample values $R_{i+1}$) at a next sampling time point (such as the $(i+1)^{th}$ sampling time point). Thus, the energy detection circuit 1 can repeat the said operation according to the adjusted weighting coefficient K to correspondingly determine whether the next sampling time point is the signal initial time point of the digital signal R and whether the energy detection circuit 1 correspondingly completes energy detection.

Then, the detection method proceeds to step 216 which is similar to step 204, by determining whether the parameter b is greater than the parameter a through the comparator 20 and providing an energy detection signal ED, the processor 22 correspondingly determines whether the energy detection circuit 1 completes energy detection. If no, then the method repeats step 212 to calculate the SNR of the input signal Si. If the energy detection circuit 1 completes energy detection, then the method proceeds to step 218, whether to continue energy detection is determined by the processor 22. If so, then the method repeats step 212 to calculate the SNR of the input signal Si, otherwise, the energy detection method terminates.

The energy detection method and the energy detection circuit using the same of the present embodiment of the disclosure obtain the signal initial time point of the input signal according to a digital signal corresponding to the input signal. According to the energy detection method and the energy detection circuit using the same of the present embodiment of the disclosure, two sliding window value obtainers, two arithmetic units, a comparator, and a processor are used in the following manners: The two the sliding window value obtainers respectively buffer the $(i-M-N+1)^{th}$ to the $(i-N)^{th}$ sample values and the $(i-N+1)^{th}$ to the $i^{th}$ sample values when receiving an $i^{th}$ sample value of a digital signal. The two arithmetic units respectively obtain the first parameter and the second parameter, which respectively correspond to the average energy value of the previous M sample values weighted with the weighting coefficient K and the average energy value of the subsequent N sample values. The comparator compares the first parameter to the second parameter, wherein the first parameter is used as a threshold of the second parameter. When the second parameter is substantially greater than the first parameter and the synchronization is successful, the processor the processor calculates the SNR of the input signal, and correspondingly sets the value of the weighting coefficient K with reference to the SNR of the input signal. Compared to the conventional energy detection method, the energy detection method and the energy detection circuit using the same of the present embodiment of the disclosure have an energy detection threshold that can be dynamically adjusted through the adjustment of the weighting coefficient K, produce superior noise immunity and result in higher accuracy in energy detection.

While the disclosure has been described by way of example and in terms of the preferred embodiment (s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An energy detection circuit used in a receiver for obtaining a signal initial time point corresponding to an input signal with reference to a digital signal corresponding to the input signal, wherein the energy detection circuit comprises:
a value obtaining switch turned on in response to a control signal to provide an $i^{th}$ sample value of the digital signal at a first sampling time point, wherein i is a natural number greater than 1;
a shift register used for buffering an $(i-M-N+1)^{th}$ to the $i^{th}$ sample values, wherein M and N both are natural numbers greater than 1, and the shift register comprises:
a first sliding window value obtainer used for buffering the $(i-M-N+1)^{th}$ to an $(i-N)^{th}$ sample values;
a second sliding window value obtainer used for buffering an $(i-N+1)^{th}$ to the $i^{th}$ sample value;
a first arithmetic unit used for obtaining a first parameter according to a weighting coefficient K and the $(i-M-N+1)^{th}$ to the $(i-N)^{th}$ sample values;
a second arithmetic unit used for obtaining a second parameter according to the $(i-N+1)^{th}$ to the $i^{th}$ sample values;
a comparator used for comparing the first parameter to the second parameter, and providing an energy detection signal when the second parameter is greater than the first parameter; and
a processor used for setting the weighting coefficient K with an initial value, wherein the processor further determines whether the energy detection signal is received, and the processor determines an $(i-N+1)^{th}$ sampling time point of the $(i-N+1)^{th}$ sample value as the signal initial time point when the energy detection signal is received.

2. The energy detection circuit according to claim 1, wherein, the processor further determines whether signal synchronization operation is achieved, and further calculates a signal to noise ratio (SNR) of the input signal when the signal synchronization operation is achieved so as to set the weighting coefficient K according to the SNR of the input signal with reference to a lookup table;
wherein, the processor further provides the control signal to drive the value obtaining switch to provide the $(i+1)^{th}$ sample value when the second parameter is not greater than the first parameter.

3. The energy detection circuit according to claim 1, wherein the shift register further comprises:
an overflowing register used for buffering an $(i-M-N)^{th}$ sample value.

4. The energy detection circuit according to claim 1, wherein the first arithmetic unit comprises:
a register used for buffering a first sum of an $(i-M-N)^{th}$ to an $(i-N-1)^{th}$ sample values;

an adder used for deducting the first sum by the $(i-M-N)^{th}$ sample value to obtain a difference, and adding the $(i-N)^{th}$ sample value to the difference to obtain a second sum of the $(i-M-N+1)^{th}$ to the $(i-N)^{th}$ sample values; and a divider used for dividing the second sum by the value M to obtain the computation parameter; and a multiplier used for obtaining the first parameter according to the computation parameter and the weighting coefficient K.

5. The energy detection circuit according to claim 1, wherein the second arithmetic unit comprises:

a register used for buffering a first sum of the $(i-N)^{th}$ to the $(i-1)^{th}$ sample values;

an adder used for deducting the first sum by the $(i-N)^{th}$ sample value to obtain a difference, and adding the $i^{th}$ sample value to the difference to obtain a second sum of the $(i-N+1)^{th}$ to the $i^{th}$ sample values; and a divider used for dividing the second sum by the value N to obtain the second parameter.

6. The energy detection circuit according to claim 5, wherein the second arithmetic unit further comprises:

a counting switch coupled between the divider and the comparator, and turned on to provide the second parameter to the comparator when i is greater than or equal to M+N.

7. The energy detection circuit according to claim 1, wherein when the synchronization of the signal is failed, the processor determines the operation of determining the sampling time point as the signal initial time point as a false alarm, and further increases the value of the weighting coefficient K;

wherein, the first arithmetic unit obtains the updated first parameter according to the increased weighting coefficient K and the $(i-M-N+1)^{th}$ to the $(i-N)^{th}$ sample values, and the comparator correspondingly compares the updated first parameter to the second parameter, and provides an updated energy detection signal when the second parameter is greater than the updated first parameter;

wherein, the processor further continuously determines whether the updated energy detection signal is received, and determines whether the synchronization of the signal is successful when receiving the updated energy detection signal.

8. The energy detection circuit according to claim 7, wherein when signal synchronization operation is achieved, the processor calculates the SNR of the input signal and accordingly sets the weighting coefficient K.

9. The energy detection circuit according to claim 1, wherein the processor decreases the value of the weighting coefficient K when the energy detection signal is not received;

wherein, the first arithmetic unit obtains the updated first parameter according to the decreased weighting coefficient K and the $(i-M-N+1)^{th}$ to the $(i-N)^{th}$ sample values, the comparator correspondingly compares the updated first parameter to the second parameter, and provides an updated energy detection signal when the second parameter is greater than the updated first parameter;

wherein, the processor further continuously determines whether the updated energy detection signal is received, and further determines whether the synchronization of the signal is successful when receiving the updated energy detection signal.

10. The energy detection circuit according to claim 9, wherein when signal synchronization operation is achieved, the processor calculates the SNR of the input signal and accordingly sets the weighting coefficient K.

11. An energy detection method used in a receiver obtaining a signal initial time point corresponding to an input signal with reference to a digital signal corresponding to the input signal, wherein the energy detection method comprises:

obtaining an $i^{th}$ sample value by sampling the digital signal at a sampling time point, wherein i is a natural number greater than 1;

buffering an $(i-M-N+1)^{th}$ to an $(i-N)^{th}$ sample values, and buffering an $(i-N+1)^{th}$ to an $i^{th}$ sample value, wherein M and N both are a natural number greater than 1;

setting a weighting coefficient K to an initial value;

obtaining a first parameter according to the weighting coefficient K and the $(i-M-N+1)^{th}$ to the $(i-N)^{th}$ sample values, and obtaining a second parameter according to the $(i-N+1)^{th}$ to the $i^{th}$ sample value;

comparing the first parameter to the second parameter to determine whether the second parameter is greater than the first parameter;

providing an energy detection signal to determine an $(i-N+1)^{th}$ sampling time point corresponding to the $(i-N+1)^{th}$ sample values as the signal initial time point, and determining whether signal synchronization operation is achieved when the second parameter is greater than the first parameter; and calculating a SNR of the input signal and accordingly setting the weighting coefficient K when the signal synchronization operation is achieved.

12. The energy detection method according to claim 11, further comprising:

determining the operation of determining the sampling time point as the signal initial time point as a false alarm, and increasing the value of the weighting coefficient K when the synchronization of the signal is failed;

obtaining the updated first parameter according to the increased weighting coefficient K and the $(i-M-N+1)^{th}$ to the $(i-N)^{th}$ sample values;

comparing the updated first parameter and the second parameter, and providing an updated energy detection signal when the second parameter is greater than the updated first parameter;

comparing the first parameter to the second parameter to determine whether the second parameter is greater than the first parameter;

providing an updated energy detection signal indicating the sampling time point is the signal initial time point and determine whether the signal synchronization operation is achieved, when the second parameter is greater than the first parameter; and calculating the SNR of the input signal and accordingly setting the weighting coefficient K when the synchronization of the signal is successful.

13. The energy detection method according to claim 11, further comprising:

decreasing the value of the weighting coefficient K when the second parameter is not greater than the first parameter;

obtaining the updated first parameter according to the decreased weighting coefficient K and the $(i-M-N+1)^{th}$ to the $(i-N)^{th}$ sample values;

comparing the updated first parameter to the second parameter, and providing an updated energy detection signal indicating the sampling time point the signal initial time point and determine whether the signal synchronization operation is achieved, when the second parameter is greater than the updated first parameter; and calculating the SNR of the input signal and accordingly setting the weighting coefficient K when the synchronization of the signal is successful.

14. The energy detection method according to claim 11, wherein further comprises:
buffering an $(i-M-N)^{th}$ sample value.

15. The energy detection method according to claim 14, wherein the step of obtaining the first parameter according to the weighting coefficient K and the $(i-M-N+1)^{th}$ to the $(i-N)^{th}$ sample values comprises:
buffering a first sum of the $(i-M-N)^{th}$ to an $(i-N-1)^{th}$ sample values;
deducting the first sum by the $(i-M-N)^{th}$ sample value to obtain a difference, and adding the $(i-N)^{th}$ sample value to the difference to obtain a second sum of the $(i-M-N+1)^{th}$ to the $(i-N)^{th}$ sample values; and
dividing the second sum by the value M and multiplied with weighting coefficient K to obtain the first parameter.

16. The energy detection method according to claim 11, wherein the step of obtaining the second parameter according to the $(i-N+1)^{th}$ to the $i^{th}$ sample values comprises:
buffering a first sum of the $(i-N)^{th}$ to the $(i-1)^{th}$ sample values;
deducting the first sum by the $(i-N)^{th}$ sample value to obtain a difference, and adding the $i^{th}$ sample value to the difference to obtain a second sum of the $(i-N+1)^{th}$ to the $i^{th}$ sample value; and
dividing the second sum by the value N to obtain the second parameter.

* * * * *